Patented June 21, 1927.

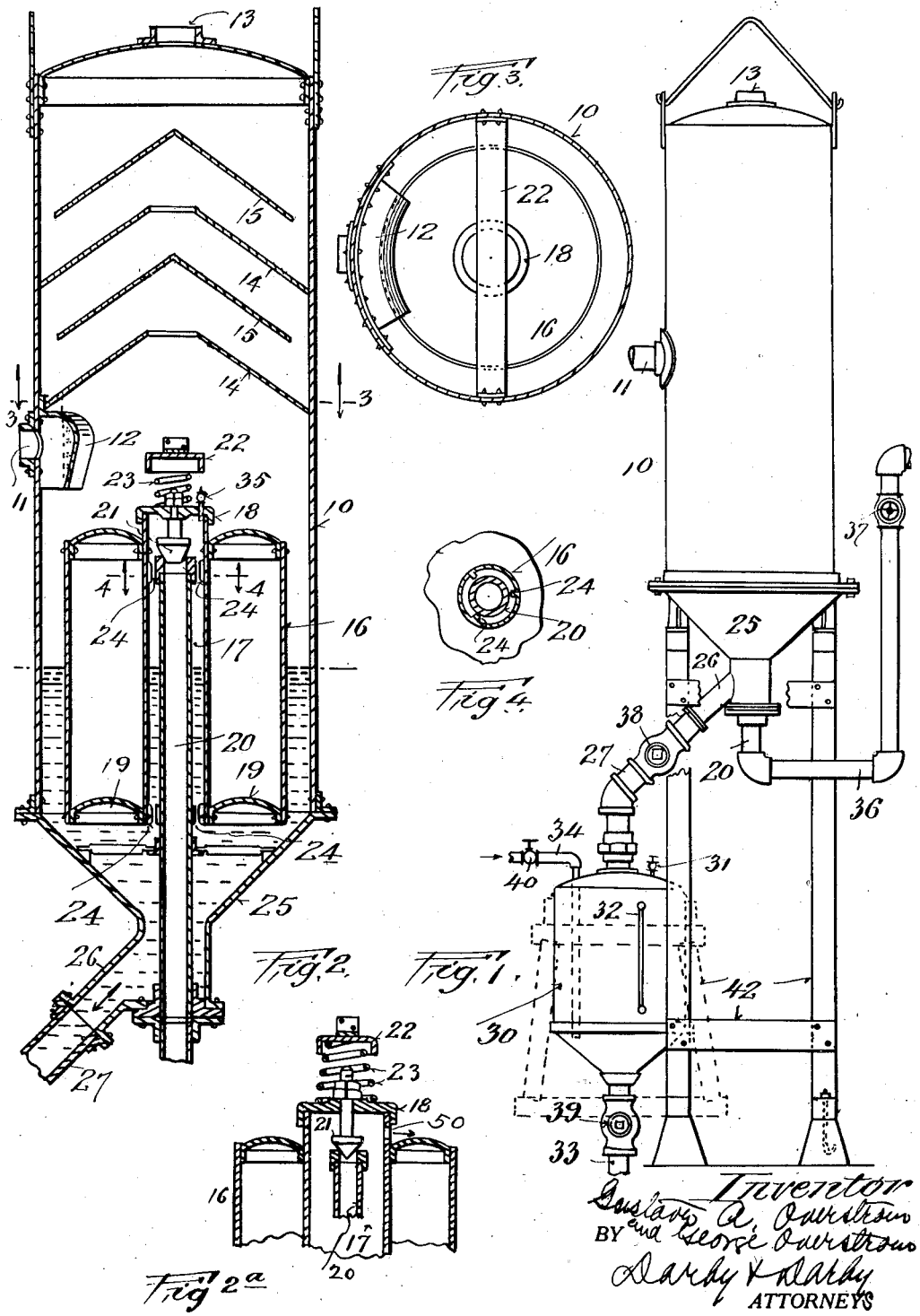

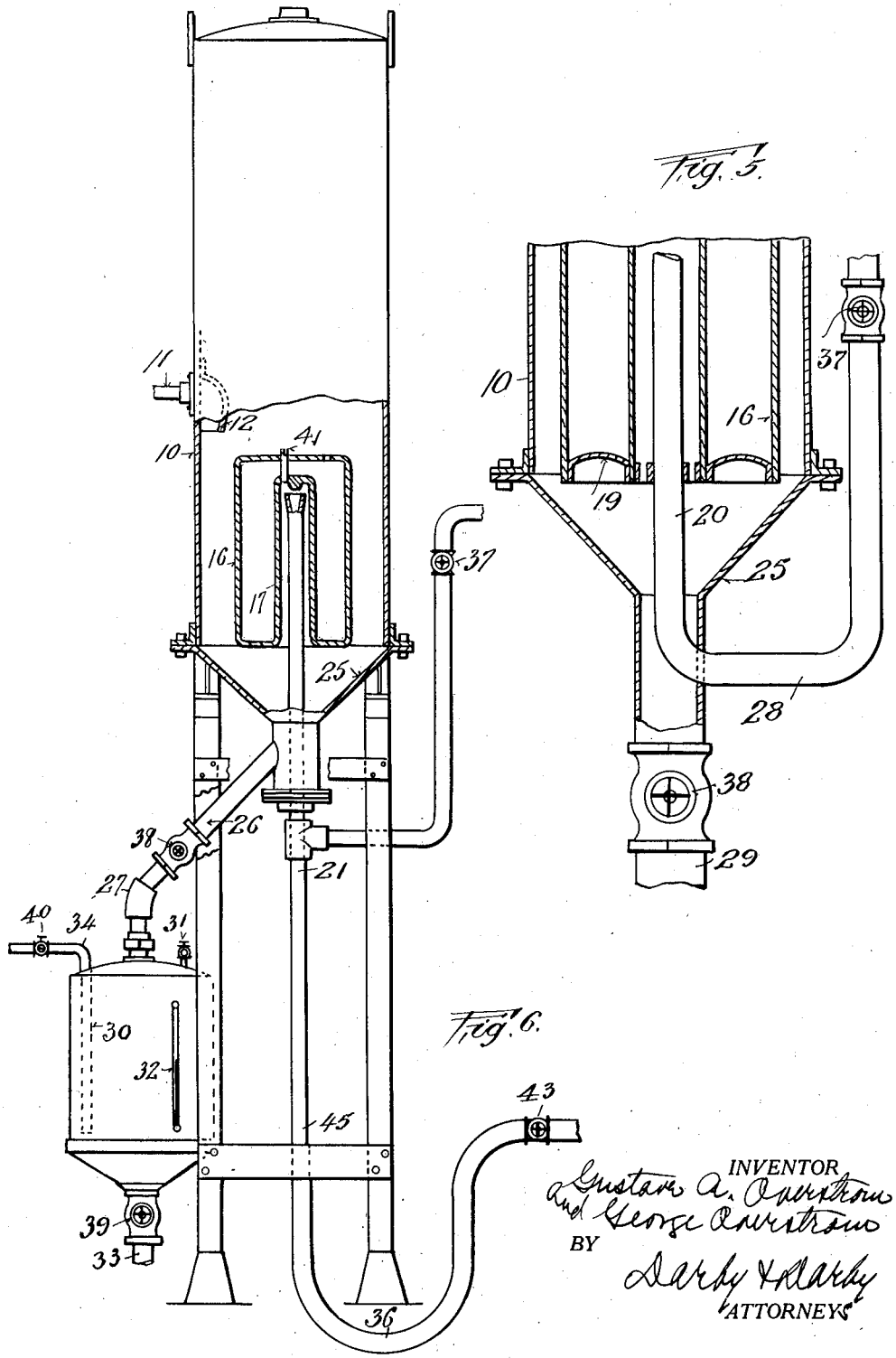

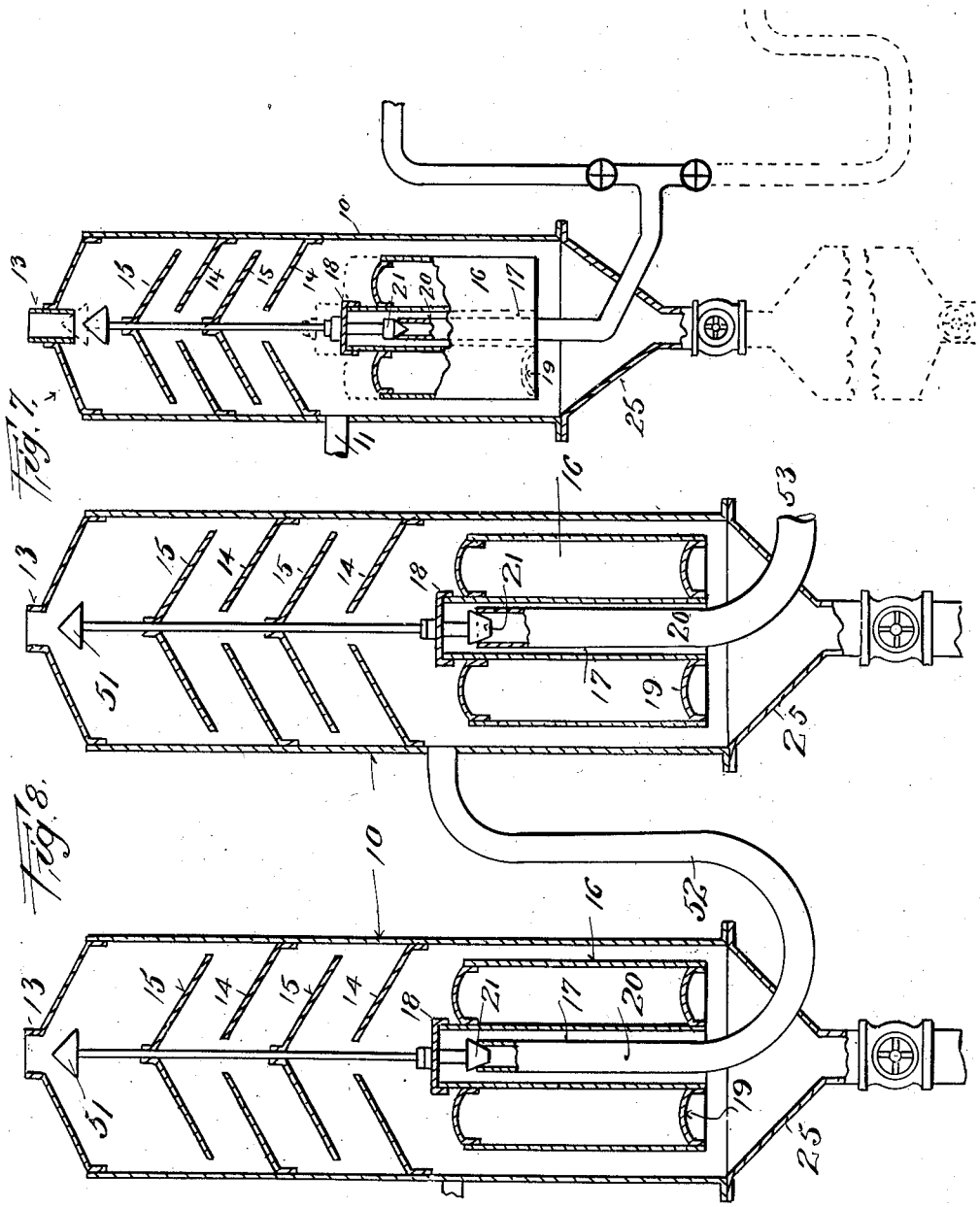

1,632,919

UNITED STATES PATENT OFFICE.

GUSTAVE A. OVERSTROM, OF LOS ANGELES, AND GEORGE OVERSTROM, OF TAFT, CALIFORNIA.

GAS AND OIL SEPARATOR.

Application filed July 5, 1923. Serial No. 649,396.

This invention relates to separators and particularly to apparatus designed to effect the separation of gas, oil, water, and sand or other foreign substances, usually found in admixture with each other in the products issuing from oil wells.

The object of the invention is to provide a separator which is simple in construction, economical to build and efficient in operation.

A further object is to provide a separator for the purpose referred to which requires no adjustments, pivoted parts or levers, hose connections, stuffing boxes, or like parts liable to wear or injury from the sand and other foreign matter present in the material to be treated.

A further object is to provide an apparatus of the nature referred to wherein the oil to be treated is separated or trapped out in a rising column thereby facilitating the separation therefrom of water, sand and other material.

A further object is to provide a trap structure or separator of the nature referred to in which the operation may be carried out under conditions of pressure or vacuum.

A further object is to provide a structure and arrangement wherein the initial output of a well may be handled and separation of oil and gas effected even under conditions of abnormally high pressure and large volume.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the accompanying drawings—

Fig. 1 is a view in elevation showing a trap or separator structure embodying the principles of our invention.

Fig. 2 is a view in vertical longitudinal central section of the same.

Fig. 2ª is a broken detail view in section illustrating a slightly modified arrangement of air relief for the float.

Fig. 3 is a view in transverse section, on the line 3—3, Fig. 2, looking in the direction of the arrows.

Fig. 4 is a fragmentary detail view in section on the line 4—4, Fig. 2, looking in the direction of the arrows, Fig. 5 is a broken view in longitudinal central section showing a slightly modified arrangement.

Fig. 6 is a similar view showing a trap or separator specially designed for operation under vacuum.

Fig. 7 is a view similar to Fig. 2 showing a structure embodying our invention wherein, under abnormally high pressures and large volumes of output from a well when initially brought in, the gas outlet is closed.

Fig. 8 is a diagram showing two tanks in tandem, for caring for abnormally high initial pressures and volumes.

The same part is designated by the same reference numeral wherever it occurs throughout the several views.

The products obtained from oil wells, consisting principally of oil and gas, frequently carry water, sand and other foreign matter which must be separated out and the oil and gas products separated from each other. The problem of efficient separation of these substances is far from simple. In the first place, a separator or trap, in order to be efficient, must not only be simple and cheap to build, but it must be rugged, strong and durable in order to enable it to withstand the rough usage to which it is subjected, as well as varying conditions of pressure encountered in the case of different wells and in different localities. Moreover, since the oil and gas products from oil wells usually carry sand and other foreign matter, a trap or separator must be free from moving parts, pivots, stuffing boxes, hose connections, and the like, which are liable to rapid wear and injury from the cutting action of the sand. The separation of the various constituents of the oil well product must be effected without loss of the valuable oil contained therein, and the apparatus should be capable of operation under the conditions of pressure or vacuum.

It is among the special purposes of our present invention to provide a trap or separator which meets these and other requirements, which is automatic in action, and which is continuous, efficient and fool-proof in operation.

Referring to the accompanying drawings, 10 designates the separator tank into which the material to be separated is supplied through pipe connection 11. It is preferred that the material be delivered tangentially into the tank 10 in order to impart a swirling motion to such material, thereby facilitating the settling down of the sand and like contents of the mass. To accomplish this we place a deflector or shield 12 on the inside of the tank over the orifice of the supply pipe connection 11. The gas delivered along with the oil and other substances into the tank 10 readily separates out and ascends into the upper end of the tank and passes out through the opening 13 in the top of the tank. Such gases frequently carry along with them oil or oil vapor and in order to prevent losses of oil from this cause we provide the upper end of the tank on the interior thereof with a series of baffles 14, 15, which, in the particular arrangement shown, are disposed in nested relation to each other, alternate baffles being open at their centers, while the intermediate ones are closed at their centers, the gases being compelled to flow around the edges or rims thereof. These baffles thus provide a tortuous path for the gases and hence permit any oil vapors or particles of oil to separate out by gravity from the gases. If desired, the upper end of the tank may contain mineral wool, broken stones, glass or the like, to still further insure against the loss of oil or oil vapors mechanically suspended in and carried by the gas.

Disposed in the lower part of the tank is a float member 16 in the form of a hollow body closed at both ends and formed with a space 17 at the axial center thereof which space is closed at its upper end by a cap 18, and is open at its lower end. The lower closed end of the float body 16 is formed with an annular channel or depression 19 for a purpose presently to be more fully explained.

Extending into the tank through its lower end is a pipe connection 20, which extends upwardly into the axial space 17, said pipe connection being open at its upper end. Cooperating with the open end of the pipe connection 20 is a valve 21, which is carried by the cap 18, said valve seating downwardly. The float member or body 16 is normally held by gravity in position for the valve 21 to seat in the open end of pipe connection 20 and close the same, but said float body is capable of rising under its own buoyancy when partially submerged in oil so as to cause said valve 21 to raise from its seat in the open end of said pipe 20. The float body may be prevented in any convenient manner from rising too high. We have shown a cross strut 22 for this purpose, said strut being secured to the inside wall of tank 10. To provide a yielding cushion for the float body a spring 23 is interposed between the float body 10 and the strut 22. When in operation the float body 16 is subject to up and down fluctuations or movements. The spring 23 serves to cushion the upward movements of the float body. The annular depression or space 19 in the bottom surface of the float body traps gas or air therein, thereby serving as a cushion for the downward movements of the float body to prevent the too violent seating of the valve 21. We do not desire, however, to be restricted to this particular arrangement for securing the desired cushioning of the movements of the float body. The float body may be guided in its up and down movements in any suitable or convenient manner. We have shown an illustrative arrangement for this purpose, wherein the walls of the central space 17 are provided at the top and bottom with spaced centering and guiding lugs or projections 24, which cooperate with the pipe section 17 to guide the float body.

At its lower end the tank is contracted into a narrowed neck portion 25, longitudinally through which the pipe section 20 extends, as shown in Figs. 2, 3 and 6, the extreme lower end of the contracted neck portion 25 being deflected laterally, as indicated at 26, for connection to a delivery pipe 27. If desired, however, the pipe connection 20 may be deflected laterally, as indicated at 28, and the delivery end of the narrowed neck portion 25 continued straight, as indicated at 29, Fig. 5.

The delivery end 29, or the delivery connection 26, 27, delivers into an auxiliary tank 30, equipped, if desired, with an air relief valve 31 in its top, a level gauge 32, a discharge connection 33, and a water supply pipe connection 34.

If desired, and preferably, the cap 18 is provided with an air relief valve 35 to prevent the trapping of air or gas in the upper portion of the space 17, although the presence of a certain amount of air or gas in the upper part of this space is not undesirable as it forms a cushion to aid the air cushion formed by the channel or depression 19 in the bottom surface of the float body.

The pipe 20 is preferably formed into a U-bend, as indicated at 36, and, in the arrangement shown in Fig. 1, the outer leg of this bend is brought to a desired height with reference to the normal flow level of the oil contained in the tank 10, where the operation of the apparatus is effected, under pressure. The various pipe connections are provided with control valves 37, 38, 39, 40 and 43, and the float body 16 is provided with an air relief valve 41, where the operation is effected under vacuum (see Fig. 6). If desired, this air relief may be afforded by a simple port opening 50 in the upper end of the float structure as shown in Fig. 2ª.

In erecting a trap or separator structure embodying our invention, any suitable supporting framework for the main and auxiliary tanks 10, 30, may be provided, as shown at 42, Fig. 1.

Having described a mechanical structure embodying our invention, we will now describe its operation under varying conditions and degrees of pressure or vacuum.

In designing and arranging the apparatus for operation under pressure conditions, the float body with its flow control valve 21 is arranged to be direct acting to close the pipe connection 20 under all pressures at, say, about forty percent of submergence of the float body, the valve to open against a maximum pressure of, say, twenty-five pounds pressure, a desirable allowance being made for varying quantities of oil product to be handled. The upper end of the pipe connection 20 (Fig. 1) to be slightly higher than the flow level of the oil in the tank at twenty-five pounds pressure. This arrangement prevents a too easily fluctuation, or rising and falling, movement of the float body. The cushion spring 23 serves to prevent the float body from reacting too strongly at the instant the valve 21 opens.

Let us suppose that the apparatus be operated with the gas at substantially atmospheric pressure, the tank to be empty and the apparatus ready to be put into operation. The weight of the float keeps the valve 21 seated. The oil and gas, carrying sand and perhaps other substances, are delivered into the tank through the supply connection 11, being given a swirling motion by reason of the tangential delivery into the tank due to the baffle or deflector plate 12. The gas constituent finds a path to the outlet opening 13 in the top of the tank through and around the baffles 14, 15, any mechanically suspended oil vapors being separated therefrom as above described. The oil, sand and other solid or liquid matter drop to the bottom of the tank and fills it up to the submergence or buoyant level of the float. The float will rise when the oil level in the tank reaches a sufficient height therein for said float to become buoyant and it will continue to rise as the height of the oil in the tank increases, until the float rise is arrested by the stop afforded by the cross strut 22. The rise of the float unseats the valve 21, but the oil will not flow off through the pipe connection 20 until it reaches the level of the upper open end of said pipe connection. When this height is reached the oil flow from the tank through the pipe connection will commence and thereafter the oil will rise in the tank only to such a height or level as to create a head sufficient to maintain the flow. This level may be called the atmospheric flow level and it corresponds very closely to the valve opening level at or against twenty-five pounds pressure. When the flow of oil from the tank through the pipe connection 20 ceases the float will again descend and cause the valve 21 to close the pipe connection.

Suppose the apparatus is to be operated under a pressure condition of two pounds per square inch and assuming that the tank is empty and the apparatus is ready for operation. The oil and gas together with sand and other foreign matter are supplied to the tank and the gas separates and flows out through the opening in the top of the tank, as before explained. Assuming the weight of the float to be 154 pounds, and the unbalanced area thereof to be eight square inches, then we have the combined weight of the float and the pressure on the unbalanced area thereof as a force to hold the valve 21 in seated or closed position; that is, we have a force of 154 pounds plus 8 times 2, or one hundred and seventy pounds, tending to keep the valve closed when the tank is empty. When the oil rises in the tank until it reaches the bottom of the float, the level of the oil in the tank on the outer side of the float will remain at the level of the bottom of the float until a column of oil rises within the space 17. When this column rises and fills the space 17 with oil and compressed air, the level of the oil in the tank at the outer side of the float will then rise, but the valve 21 will not be unseated until the level of the oil in the tank rises sufficiently high to overcome the unbalanced pressure on the float. In other words, assuming the weight of the oil to be 0.03 lbs. per cubic inch and the displacement of the float to be 424 cubic inches per inch of longitudinal dimension, there must be a displacement of at least 533 cubic inches of oil, that is, a rise of 1¼ inches of the oil level above the buoyancy level of the float, before the valve 21 opens. When this occurs the flow of oil through the pipe connection 20 will start, and will continue as long as the conditions mentioned are maintained. Thus the level of the oil in the tank will fluctuate up and down in the tank during the flow through the pipe 20 within the range of the buoyancy level of the float to a height of 1¼ inches above that level, the valve approaching its closed position as the buoyancy level is approached, and opening wider as the height of level of the oil in the tank increases above the plane of float buoyancy level. The valve therefore acts as a reducing valve, remaining more widely open when the flow of oil from the tank through pipe 20 is large, and more nearly closed when such flow is small.

Now suppose the apparatus is to operate under a pressure of twenty-five pounds. In this case we have a seating force applied to the valve when the tank is empty, of the weight of the float say, for example, 154 pounds plus eight times twenty-five, or two hundred lbs., a total of 354 pounds. Under these conditions when the oil reaches the buoyancy level of the float there is still a pressure of 200 lbs. applied to the float to hold the valve seated. This is equivalent to 6,667 cubic inches of oil, and consequently a height of oil level in the tank of very nearly 16 inches (15.7 to be exact) above the buoyancy level of the float is required to cause the valve to open against 25 lbs. pressure. The oil level under these conditions will fluctuate within this range of 16 inches, according to the volume of flow from the tank through the pipe 20, the higher the level the greater will be the volume of flow and the lower the level the lower the volume of flow. No matter what the pressure is the oil level in the tank will not fall below the buoyancy level of the float, for the reason that as soon as it does fall below that level the valve closes and the height of level of the oil in the tank again rises, the valve remaining closed until the oil level rises sufficiently to overcome the unbalanced pressure. Here again the float becomes balanced as soon as the valve opens, and fluctuates up and down, according to the conditions which render the same balanced.

Suppose it is desired to operate the apparatus under vacuum. Starting with the tank empty, and assuming the same weight and unbalanced area of float as in the examples above given, and a vacuum force of ten pounds per square inch, we have, then, a a suction force of 8 x 10 or 80 lbs. per square inch tending to lift the float. The oil and gas are delivered into the tank and the level of the oil rises until the combined force of the suction and buoyancy of the float causes the latter to rise and unseat the valve. The weight to be lifted by the buoyancy of the float in this case is 154—80, or 74 lbs. and this will require a height level of oil in the tank of only six inches above the bottom of the float. Any air or gas trapped in the space 17 may be eliminated by the small air valve 41 (see Fig. 6). Preferably this valve should automatically close when the apparatus is operated under pressure, and open when operating under vacuum. The draft pipe 45 fills as soon as the oil level in the tank reaches the upper open end of pipe 20. This establishes a syphonic flow of the oil from the tank, which is maintained by the head of the oil in the tank above the height of the delivery end of pipe 45. If this height distance is, say, three feet, the head pressure will be about 1⅛ lbs. pressure. This pressure combines with the weight of the float in tending to pull the float down when the valve is closed before starting the vacuum but is absorbed by friction through the valve after starting the vacuum, so that the float becomes balanced, as in the case of operation under pressure. When the flow of oil ceases the valve closes, and it is only necessary to raise the float through a height of about one inch to secure full volume of flow under the conditions assumed.

Suppose it is desired to operate under a vacuum of only one pound. The tank and the draft pipe 45 will fill up, as above described, but now we have about 24 feet excess head pressure or about 9 lbs. per square inch on the draft pipe 45 and the unbalanced area of the float. This means the lifting of only 72 lbs. weight to open the valve. Under these conditions a U-bend 36 is necessary in order to prevent entrance of air which will destroy the syphonic flow. The 72 lbs. weight to be raised equals about 5.62 inches of displacement of the float so that the extreme variation in level of the oil in the tank will be about six inches.

Whether working under pressure or under vacuum the sand and other solid matter and any water contained in the oil and gas supply to the tank will settle into the restricted lower portion of the tank and pass from the tank through the connection 26, or 29. These connections deliver to an auxiliary tank or sand drum 30. The control valve 38 in the connections between the two tanks enables such connections to be closed so as to enable the sand and other sediment to be drawn off from tank 30 whether the operation of the apparatus is under pressure or vacuum, without loss. By piping water into the tank 30, the accomulated sand and sediment collected in said tank may be washed out.

From the foregoing description it will be seen that we provide a trap or separating apparatus which is equally well adapted for operation under pressure or under vacuum. The oil flow is first in a rising column in the tank and this very greatly facilitates the settling and precipitation of sand and other solid matter. There are no joints or hose connections and no stuffing boxes to wear out. No adjustments are required and the apparatus works continuously and automatically. There is no loss of oil and no exposure of the oil to the air.

In some regions it sometimes happens that a high pressure exists in oil wells when first brought in, and in some instances the gas, oil and water mixture comes from the wells in gushes. In such cases the mixture comes from the wells under excessively high pressure and in large volume so that a trap or separator of ordinary size and capacity is unable to handle the well output, the trap or separator becoming filled up faster than separation can be effected, the result being that the oil is delivered or forced out through the gas outlet. Various attempts have been made to overcome this objection, but, so far as we are aware, the expedients heretofore resorted to comprise more or less complicated systems of floats and regulators, with pivoted parts and levers to automatically shut off the gas line when a certain pressure is developed in the tank, thereby compelling the gas to be driven through the oil outlet along with the oil. This abnormal condition of pressure and volume of output in the case of a new well when first brought in usually continues for a few days or weeks and then the flow settles down to a more or less normal condition whereupon the normal operation of the trap is resumed. And in the case of gushing wells the output comes more or less intermittently in surges or impulses of greater or less duration when abnormal pressure and volume conditions are encountered. In order to meet these conditions in a simple and efficient manner, without complicated regulator or valve operating connections, pivoted levers or the like, we propose to mount a valve 51, see Figs. 7 and 8, directly upon the float 16, and arrange the same to cooperate with the gas outlet 13 to close the latter when a predetermined volume of oil accumulates in the tank. Thus both the gas outlet and oil outlet control valves 51, 21, are carried directly by the float and they should be so arranged as to prevent the gas outlet from being closed during the time the apparatus is working under normal conditions, and to close the gas outlet when abnormal pressure and volume conditions are encountered. When the gas outlet control valve is closed the oil and gas are both forced out through the oil outlet.

In case it becomes desirable to separate and save any gas thus escaping from the tank along with the oil, we provide the arrangement shown in diagram in Fig. 8, wherein two or more tanks are connected up in tandem, the gas and oil delivery pipe 52 from the first tank becoming the delivery connection into the second one. In this case the connection 52 should be of smaller cross sectional area than the oil outlet connection 53 from the second tank. Thus the first tank becomes a high pressure tank while the second one becomes a low pressure tank, the first one permitting normal operation until the gas outlet is closed and thereafter acting as a pressure reducer for the second tank. It is obvious that additional tanks may be thus coupled up in series where the conditions of pressure and volume of output from the well may require it. As soon as the pressure and volume conditions again become normal the additional tanks or reservoirs may be disconnected and removed.

Having now set forth the objects and nature of our invention, we wish it to be understood that many variations and changes in the details might readily occur to persons skilled in the art and still fall within the spirit and scope of our invention. We do not desire, therefore, to be limited to the exact details shown and described.

But what we claim as new and useful and of our joint invention, and desire to secure by Letters Patent, is:—

1. In a separating apparatus for treating oil and gas, a tank having a supply connection thereto and a gas outlet in its top, a delivery pipe connection extending into the tank through the bottom thereof, a float arranged in the tank and carrying a valve to control the upper open end of said delivery pipe, said float arranged to encompass said delivery pipe and to provide a space therebetween and float guides in said space.

2. In a separating apparatus for treating oil and gas, a tank having a supply connection thereto, and a gas outlet in its top, an oil delivery pipe extending into the tank, a normally unbalanced float surrounding the inner end of said delivery pipe and into which said pipe opens and a valve carried by said float to control the inner open end of said pipe.

3. In a separating apparatus for treating oil and gas, a tank having a supply connection thereto, a shield for said supply connection, a gas outlet at one end of said tank, a delivery pipe extending into the tank through the other end, and a normally unbalanced float surrounding the inner end of said delivery pipe but spaced therefrom and carrying a valve to control the inner open end of said pipe for delivering the separated oil, said supply connection shield effecting delivery tangentially into said tank.

4. In a separating apparatus for treating oil and gas, a tank having a supply connection thereto, and a gas outlet in its top, a delivery pipe extending into the tank through the bottom thereof, and a normally unbalanced float surrounding the inner end of said delivery pipe but spaced therefrom and carrying a valve to control the inner open end of said pipe, the upper part of said tank having baffle members through and around which the gas flows towards the gas outlet.

5. In a separating apparatus for treating oil and gas, a tank having a supply connection thereto, and a gas outlet in its top, a delivery pipe extending into the tank through the bottom thereof, a normally unbalanced float surrounding the inner end of said delivery pipe but spaced therefrom, a valve within the float to control the inner open end of said pipe, and means to cushion the up and down movements of the float.

6. In a separating apparatus for treating oil and gas, a tank having a supply connection thereto, and a gas outlet in its top, a delivery pipe extending into the tank, a normally unbalanced float surrounding the inner end of said delivery pipe but spaced therefrom and carrying a valve to control the inner open end of said pipe, and a strut arranged in the tank to form a stop to limit the upward movements of the float.

7. In a separating apparatus for treating oil and gas, a tank having a supply connection thereto, and a gas outlet in its top, a delivery pipe extending into the tank, a normally unbalanced float surrounding the inner end of said delivery pipe but spaced therefrom and carrying a valve to control the inner open end of said pipe, a strut arranged in the tank to form a stop to limit the upward movements of the float, and a spring interposed between the strut and float.

8. In a separating apparatus for treating oil and gas, a tank having a supply connection thereto, and a gas outlet in its top, a delivery pipe extending into the tank through the bottom thereof, a normally unbalanced float surrounding the inner end of said delivery pipe but spaced therefrom, a valve within the float to control the inner open end of said pipe, and means to cushion the downward movements of the float.

9. In a separating apparatus for treating oil and gas, a tank having a supply connection thereto, and a gas outlet in its top, a delivery pipe extending into the tank, a normally unbalanced float surrounding the inner end of said delivery pipe but spaced therefrom and carrying a valve to control the inner open end of said pipe, and an annular channel or depression formed in the lower end of the float.

10. In a separating apparatus for treating oil and gas, a tank having a supply connection thereto, and a gas outlet in its top, a delivery pipe extending into the tank, a normally unbalanced float surrounding the inner end of said delivery pipe but spaced therefrom, a valve on the float to control the inner open end of said pipe, and means carried by the float to guide the same in its up and down movements on said delivery pipe end.

11. In a separating apparatus for treating oil and gas, a tank having a supply connection thereto, and a gas outlet in its top, an oil delivery pipe extending into the tank, a normally unbalanced float surrounding the inner end of said delivery pipe but spaced therefrom, a valve on the float to control the inner open end of said pipe, and a shield or baffle member disposed within the tank over the delivery end of said supply connection.

12. In a separating apparatus for treating oil and gas, a tank having a supply connection thereto, and a gas outlet in its top, an oil delivery pipe extending into the tank, a normally unbalanced float surrounding the inner end of said delivery pipe but spaced therefrom, a valve on the float to control the inner open end of said pipe, an auxiliary tank, and a connection from the lower end of the main tank to said auxiliary tank.

13. In a separating apparatus for treating oil and gas, a tank having a supply connection thereto, and a gas outlet in its top, an oil delivery pipe extending into the tank, a normally unbalanced float surrounding the inner end of said delivery pipe but spaced therefrom, a valve on the float to control the inner open end of said pipe, the lower end of said tank being restricted and having a delivery connection therefrom for sand or other sediment, a receiving tank into which said delivery connection delivers, and a water supply connection extending into said receiving tank.

14. In a separating apparatus for treating oil and gas, a tank having a supply connection thereto, and a gas outlet in its top, an oil delivery pipe extending into the tank, and a normally unbalanced float surrounding the inner end of said delivery pipe but spaced therefrom, a valve on the float to control the inner open end of said pipe, said delivery pipe having a U-bend therein outside of said tank.

15. In a separating apparatus for treating oil and gas, a tank having a supply connection thereto, and a gas outlet in its top, deflector plates between said supply and said outlet, a float arranged within the tank and having a central space open at the bottom and closed at the top, a delivery pipe extending into the chamber and into the central space of said float, and a valve carried by said float to control the inner open end of said pipe.

16. In a separating apparatus for treating oil and gas, a tank having a supply connection thereto, and a gas outlet in its top, a delivery pipe extending into the tank through the bottom thereof, and a normally unbalanced float surrounding the inner end of said delivery pipe but spaced therefrom and carrying a valve to control the inner open end of said pipe, said float having a relief air valve at its top.

17. In a separating apparatus for treating oil and gas, a tank having a supply connection thereto, and a gas outlet in its top, a float arranged within the tank and having a central space open at the bottom and closed at the top, a delivery pipe extending into the chamber and received within the central space of said float, and a valve carried by said float to control the inner open end of said pipe, the float having a relief air valve at the closed end of said space.

18. In a separating apparatus for treating oil and gas, a tank having a supply connection thereto, and a gas outlet in its top, an oil delivery pipe extending into the tank, a normally unbalanced float surrounding the inner end of said delivery pipe but spaced therefrom and carrying a valve to control the inner open end of said pipe, the lower end of said tank being restricted and having a delivery connection therefrom for sand or other sediment, a receiving tank into which said delivery connection delivers, a water supply connection extending into said receiving tank, and a relief air valve in the top of said receiving tank.

19. In a separating apparatus for treating oil and gas, a tank having supply, gas outlet and oil outlet, connections, a float arranged to surround the oil outlet within the tank, valves carried on and operated by said float and respectively arranged to control the gas and oil outlet connections, and means associated with the supply connection to said tank to reduce the pressure of such supply.

In testimony whereof we have hereunto set our hands on this 26th day of May, A. D. 1923.

GUSTAVE A. OVERSTROM.
GEORGE OVERSTROM.